US009302274B2

(12) United States Patent
Nagaraj et al.

(10) Patent No.: US 9,302,274 B2
(45) Date of Patent: Apr. 5, 2016

(54) COLLECTOR COMPOSITIONS AND METHODS OF USING THE SAME

(71) Applicant: CYTEC TECHNOLOGY CORP., Wilmington, DE (US)

(72) Inventors: Devarayasamudram Ramachandran Nagaraj, Ridgefield, CT (US); Peter Riccio, New Rochelle, NY (US); Tarun Bhambhani, Stamford, CT (US); Alan S. Rothenberg, Wilton, CT (US); Carmina Quintanar, Santiago (CL); Bing Wang, Brookfield, CT (US)

(73) Assignee: CYTEC TECHNOLOGY CORP., Wilmington, DE (US)

( * ) Notice: Subject to any disclaimer, the term of this patent is extended or adjusted under 35 U.S.C. 154(b) by 501 days.

(21) Appl. No.: 13/653,669

(22) Filed: Oct. 17, 2012

(65) Prior Publication Data

US 2013/0092603 A1   Apr. 18, 2013

Related U.S. Application Data

(60) Provisional application No. 61/548,402, filed on Oct. 18, 2011.

(51) Int. Cl.
| *B01D 21/01* | (2006.01) |
| *B03D 1/01* | (2006.01) |
| *B03D 1/02* | (2006.01) |
| *C01B 33/26* | (2006.01) |
| *B03D 1/014* | (2006.01) |
| *B01D 21/00* | (2006.01) |
| *B03D 1/012* | (2006.01) |

(52) U.S. Cl.
CPC ............ *B03D 1/014* (2013.01); *B01D 21/0084* (2013.01); *B01D 21/01* (2013.01); *B03D 1/01* (2013.01); *B03D 1/012* (2013.01); *B03D 2201/02* (2013.01); *B03D 2203/02* (2013.01)

(58) Field of Classification Search
CPC .... B01D 15/00; B01D 21/01; B01D 21/0084; C02F 1/24; B03D 1/01; B03D 1/001; B03D 1/011; B03D 1/012; B03D 1/014; B03D 1/02; B03D 2201/02; C01B 33/26
USPC .......... 209/164–167; 210/702–705, 709, 724, 210/723, 734, 735, 738; 252/61
See application file for complete search history.

(56) References Cited

U.S. PATENT DOCUMENTS

| 1,949,956 | A | | 3/1934 | Derby et al. | |
| 2,043,192 | A | * | 6/1936 | Christmann et al. | .......... 209/166 |
| 2,063,629 | A | | 12/1936 | Salzberg et al. | |
| 2,074,699 | A | | 3/1937 | Lenher et al. | |
| 2,120,217 | A | * | 6/1938 | Harris | ........................... 209/166 |
| 2,134,706 | A | | 11/1938 | Derby et al. | |
| 2,185,968 | A | | 1/1940 | Ralston et al. | |
| 2,201,535 | A | * | 5/1940 | Harris | ............................... 554/90 |
| 2,221,377 | A | * | 11/1940 | Harris | ............................... 560/149 |
| 2,267,307 | A | | 12/1941 | Ralston et al. | |
| 2,278,020 | A | | 3/1942 | Ralston et al. | |
| 2,330,587 | A | | 9/1943 | Jayne, Jr. | |
| 2,389,718 | A | | 11/1945 | Davis | |
| 2,812,332 | A | | 11/1957 | Pennino | |
| 2,919,025 | A | * | 12/1959 | Booth et al. | ................... 209/166 |
| 2,991,430 | A | | 7/1961 | Allred et al. | |
| 3,002,014 | A | | 9/1961 | Dinsmore et al. | |
| 3,238,127 | A | * | 3/1966 | Sebba | ........................... 210/704 |
| 3,355,017 | A | * | 11/1967 | Wystrach et al. | ............. 209/166 |
| 3,425,550 | A | | 2/1969 | Baarson et al. | |
| 3,476,553 | A | * | 11/1969 | Charles et al. | ................... 75/429 |
| 3,536,679 | A | * | 10/1970 | Langer, Jr. | ..................... 526/180 |
| 3,570,772 | A | * | 3/1971 | Booth et al. | ................ 241/24.13 |
| 3,595,390 | A | * | 7/1971 | Booth | .................... B03D 1/008 209/166 |
| 3,671,612 | A | | 6/1972 | Roszinski et al. | |
| 3,737,458 | A | * | 6/1973 | Langer et al. | ................. 564/374 |
| 3,742,099 | A | | 6/1973 | Colclough et al. | |
| 3,788,467 | A | | 1/1974 | Werneke | |
| 3,845,862 | A | | 11/1974 | McGuire et al. | |
| 3,845,863 | A | | 11/1974 | Savia | |
| 3,925,218 | A | | 12/1975 | Zipperian et al. | |
| 3,971,836 | A | | 7/1976 | Strow et al. | |
| 4,036,746 | A | | 7/1977 | Strow et al. | |
| 4,040,950 | A | | 8/1977 | Zipperian et al. | |
| 4,102,781 | A | | 7/1978 | Tenbergen | |
| 4,122,004 | A | * | 10/1978 | Harris | ..................... B03D 1/012 209/166 |
| 4,130,477 | A | * | 12/1978 | Podobnik | ............... B03D 1/012 209/166 |
| 4,472,288 | A | | 9/1984 | Frost, Jr. | |
| 4,530,758 | A | | 7/1985 | Tibbals et al. | |
| 4,584,097 | A | * | 4/1986 | Fu et al. | ....................... 209/166 |
| 4,595,493 | A | * | 6/1986 | Nagaraj | ........................ 209/166 |

(Continued)

FOREIGN PATENT DOCUMENTS

| CA | 771181 A | 11/1967 |
| CA | 808222 A | 3/1969 |

(Continued)

OTHER PUBLICATIONS

Office Action of U.S. Appl. No. 13/653,713 dated Mar. 19, 2015.

(Continued)

*Primary Examiner* — Joseph Drodge

(74) *Attorney, Agent, or Firm* — Charles E. Bell

(57) ABSTRACT

Formulations for value mineral collector compositions composed of at least one first collector selected from an organic ammonium salt of an organic sulfur-containing acid; and at least one second collector selected from neutral collectors and/or organic ammonium salts of an organic sulfur-containing acids, such that the second collector is different from said first collector, are provided herein, along with methods for making and using same.

34 Claims, No Drawings

(56) References Cited

U.S. PATENT DOCUMENTS

| | | | |
|---|---|---|---|
| 4,601,818 A * | 7/1986 | Bresson et al. | 209/166 |
| 4,684,459 A | 8/1987 | Klimpel et al. | |
| 4,699,712 A | 10/1987 | Unger | |
| 4,789,466 A | 12/1988 | von Rybinski et al. | |
| 4,793,852 A * | 12/1988 | Harris et al. | 423/26 |
| 4,830,739 A | 5/1989 | Hellsten et al. | |
| 4,879,022 A * | 11/1989 | Clark et al. | 209/166 |
| 4,908,125 A * | 3/1990 | Mackenzie et al. | 209/166 |
| 5,147,572 A | 9/1992 | Bush | |
| 5,929,408 A * | 7/1999 | Gutierrez et al. | 209/166 |
| 6,732,867 B2 | 5/2004 | Magliocco et al. | |
| 6,756,346 B1 | 6/2004 | Baba et al. | |
| 6,820,746 B2 | 11/2004 | Magliocco et al. | |
| 6,988,623 B2 | 1/2006 | Magliocco et al. | |
| 7,011,216 B2 | 3/2006 | Magliocco et al. | |
| 7,165,680 B2 | 1/2007 | Rajic et al. | |
| 7,299,930 B2 | 11/2007 | Correa-Castillo et al. | |
| 8,376,142 B2 * | 2/2013 | Nagaraj | 209/166 |
| 8,720,694 B2 * | 5/2014 | Nagaraj et al. | 209/166 |
| 2005/0150330 A1 | 7/2005 | Rajic et al. | |
| 2010/0021370 A1 * | 1/2010 | Nagaraj et al. | 423/561.1 |

FOREIGN PATENT DOCUMENTS

| | | |
|---|---|---|
| CA | 1105156 A | 7/1981 |
| CA | 1188014 A | 5/1985 |
| CA | 1299777 C | 4/1992 |
| EP | 1439216 A1 | 7/2004 |
| GB | 1353976 A | 5/1974 |
| GB | 2178446 A | 2/1987 |
| JP | 2001247848 A | 9/2001 |
| JP | 2003064347 A | 3/2003 |
| WO | 03049867 A1 | 6/2003 |
| WO | 2008019451 A1 | 2/2008 |

OTHER PUBLICATIONS

International Search Report of PCT/US2012/060525; mailing date Jun. 18, 2013.
Written Opinion of PCT/US2012/060525; mailing date Jun. 18, 2013.
Office Action of U.S. Appl. No. 13/653,732 dated Mar. 20, 2015.
International Search Report and Written Opinion of PCT/US2012/060526; mailing date Oct. 9, 2013.
International Search Report and Written Opinion of PCT/US2012/060527; mailing date Jul. 5, 2013.

* cited by examiner

COLLECTOR COMPOSITIONS AND METHODS OF USING THE SAME

CROSS-REFERENCE TO RELATED APPLICATIONS

This application claims benefit of priority from U.S. Provisional Application No. 61/548,402 filed Oct. 18, 2011 the content of which is incorporated herein by reference in its entirety. This application is also related in subject matter to U.S. Provisional Application No. 61/548,408 filed Oct. 18, 2011; and to U.S. Provisional Application No. 61/548,417 filed Oct. 18, 2011.

BACKGROUND OF THE INVENTION

1. Field

The disclosed subject matter relates generally to formulations of collector compositions for the recovery of value minerals from mineral ore bodies. More particularly, the disclosed subject matter relates to organic sulfur-containing collector compositions and methods for using the same.

2. State of the Art

Froth flotation is a widely used process for beneficiating ores containing valuable minerals, often referred to as "value minerals". Value mineral(s) refer to the metal, metals, mineral or minerals that are the primary object of the flotation process, i.e., the metals and minerals from which it is desirable to remove impurities.

A typical froth flotation process involves intermixing an aqueous slurry that contains finely ground ore particles with a frothing or foaming agent to produce a froth. Ore particles that contain the value mineral(s) are preferentially attracted to the froth because of an affinity between the froth and the exposed mineral on the surfaces of the ore particles. The value minerals are then collected by separating them from the froth. Chemical reagents, referred to as "collectors," are commonly added to the froth flotation process to effect the separation. Certain theory and practice indicates that success of a flotation process for base metal sulfide and precious metal ores is dependent on the collectors which impart selective hydrophobicity to the value mineral separated from other minerals. See, e.g., U.S. Pat. No. 4,584,097, the entirety of which is incorporated by reference herein.

Other reagents, such as "frothers", may be added to the process to provide a suitable basic froth phase to capture hydrophobic value minerals and facilitate separation and recovery thereof. Certain other reagents, referred to as "modifiers", may be used to enhance separation and recovery of the desired minerals and/or metals. Modifiers, which can include pH regulators, may be used to modify and control the pH of the ore pulp in order to enhance separation and recovery of the desired minerals and/or metals. In some instances, compounds referred to as "activators", such as copper sulfate, may be used to activate a certain value sulfide mineral in order to enhance collector coating on this sulfide mineral.

Froth flotation is especially useful for separating finely ground value minerals from the associate gangue or for separating value minerals from one another. Because of the large scale on which mining operations are typically conducted, and the large difference in value between the desired minerals and the associated gangue, even relatively small increases in separation efficiency provide substantial gains in productivity. Additionally, the large quantities of chemicals used in mining and mineral processing pose a significant challenge in terms of health and safety to humans and the environment. Consequently, the industry is continually searching for effective alternatives that increase safety while lessening the impact on the environment.

Currently, a large variety of organic sulfur-containing compounds such as xanthates, dithiophosphates, dithiocarbamates, etc, are utilized as collectors in the flotation recovery of value minerals from sulfide and precious metal ores. Existing thought about such compounds is that either the free acid or any salt of the acid can be used in flotation, and that all the salts and free acid are equivalent. In other words, it is believed that a sodium salt of an organic sulfur-containing acid can be substituted with a calcium salt or an inorganic ammonium salt, and obtain substantially the same result. Moreover, most of the collectors based on organic sulfur-containing salts are aqueous and are the sodium or potassium salts of sulfur-containing acid. Thus, when names of collectors are mentioned, such as a xanthate or dithiophosphate, it is in reference to a sodium, inorganic ammonium or potassium salt.

A commonly used collector, xanthic acid, is an ionic compound that is produced and transported as solid sodium or potassium salts of xanthic acid, widely known as xanthates, and is used as aqueous solutions at the mine site. While they have shown value in mining processes, xanthates oxidize and hydrolyze in the presence of water thereby releasing hazardous byproducts. Solid xanthate can pose a fire hazard. Other common water-soluble ionic collectors pose similar hazards to a varying degree.

Frequently it is advantageous to mix two or more collectors for use in a froth flotation process. These mixtures can either be two or more aqueous ionic collectors, or mixtures of ionic collectors with charge neutral oily collectors (referred herein as "neutral collectors"). The latter mixtures are often preferred because of certain characteristics. However, formulations of aqueous ionic collectors and non-aqueous neutral collectors in general present a significant challenge, as these formulations are often incompatible, unstable and generate toxic by-products, such as gases or aqueous species or precipitates, thus posing significant environmental and health hazards. These formulations are also physically unstable, i.e., they separate into phases and generate precipitates, thus minimizing the types of compositions that can be made using combinations of aqueous ionic collectors and non-aqueous neutral collectors and thereby negating or minimizing synergistic advantages. In fact, some aqueous collectors cannot be mixed with neutral collectors at all, e.g., xanthates, since they will result in chemically unstable compounds that generate toxic byproducts. Similarly, some neutral collectors cannot be mixed with aqueous collectors at all, e.g., dialkyl xanthogen formates.

Many formulations that contain either two or more ionic collectors, or mixtures of ionic collectors with charge neutral collectors, further utilize diluents and coupling agents to ensure compatibility. Such diluents and coupling agents may be hazardous. Indeed, in a few cases, compatible formulations cannot be prepared without significant dilution and/or introduction of undesirable coupling agents; even then, only a narrow range of formulations is practicable. The presence of water in these formulations can cause undesirable side reactions, generate species that are toxic and hazardous, and present a challenge to shipment of the same.

Many current collector formulations do contain water, which reduces the available active collector and contributes significantly to transportation costs. Given the recent increase in fuel costs, cost-effective transportation and energy savings are important in developing alternatives to current collectors.

In view of the foregoing, there is a need in the art to develop a stable collector formulation that offers cost savings as well as reductions in hazards to humans and the environment. The inventors of the instant invention believe the subject matter disclosed and claimed herein is an answer to those needs.

SUMMARY OF THE INVENTION

The value mineral collector compositions composed of organic ammonium salts of organic sulfur-containing acids as described herein are practical, economically attractive and environmentally friendly alternatives compared to current aqueous ionic collectors such as alkali metal salts of organic sulfur-containing acids. Consequently, the collector compositions of the present invention offer many advantages, including easier handling, as well as reduced costs to ship the compositions to remote metallurgical plants. The collector compositions of the current invention also exhibit high physical compatibility and chemical stability, (i.e., no toxic gases, byproducts, or precipitates are generated), and do not require the use of hazardous coupling agents or diluents. Additionally, the collector compositions of the present invention exhibit a safer and more benign environmental profile as compared to currently known and used collectors. More importantly, and as shown in more detail below, the collector compositions of the present invention surprisingly exhibit improved value mineral recovery.

Accordingly, in one aspect the present invention is directed to a collector composition comprising: a) a first collector comprising an organic primary, secondary, tertiary or quaternary ammonium salt of an organic sulfur-containing acid selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids, hydrocarbyl trithiocarbonic acids, hydrocarbyl dithiophosphinic acids and hydrocarbyl monothiophosphinic acids; and b) at least one second collector, the second collector selected from the group of neutral collectors and organic ammonium salts of organic sulfur-containing acids, wherein the organic ammonium salt of a sulfur-containing acid of the second collector is different from said first collector, wherein when the first collector comprises a primary or secondary ammonium salt of an organic sulfur-containing acid and the second collector is a neutral collector, the neutral collector is selected from a group consisting of dihydrocarbyl thionocarbamates, dihydrocarbyl thioureas, dihydrocarbyl sulfides, trihydrocarbyl dithiocarbamates, N-hydrocarbyl-S-hydrocarbyl dithiocarbamates, dihydrocarbyl guanidines, S-hydrocarbyl dithiophosphinates, S-hydrocarbyl dithiophosphates, S-hydrocarbyl mercaptobenzothiazoles, O-hydrocarbyl monothiophosphates, and O-hydrocarbyl monothiophosphinates.

In a further aspect, the present invention provides methods of recovering at least one value mineral from a mineral ore body by grinding an ore containing at least one value mineral to form ground ore; forming a slurry comprising the ground ore; intermixing an effective amount of a collector composition as described herein with at least one of the ground ore, the slurry, and combinations thereof; generating a froth with the slurry; and recovering the at least one value mineral from the froth.

These and other objects, features and advantages of this invention will become apparent from the following detailed description of certain embodiments of the invention taken in conjunction with the accompanying Examples.

DETAILED DESCRIPTION OF CERTAIN EMBODIMENTS OF THE INVENTION

The present invention generally relates to collector compositions used in the recovery of value minerals from an ore, and froth flotation processes employing those compositions. In general, ores contain, inter alia, both "value" and "non-value" minerals. In this context, "value" mineral(s) refer to the metal, metals, mineral or minerals that are the primary object of the flotation process, i.e., the metals and minerals from which it is desirable to remove impurities. Examples of metals of interest include, but are not limited to, gold, silver, platinum, palladium and other platinum group metals, copper, nickel, molybdenum, cobalt, lead and zinc, as well as combinations thereof. The term "non-value" mineral refers to the metal, metals, mineral or minerals for which removal from the value mineral is desired, i.e., impurities in the value mineral. A non-value mineral is not necessarily discarded, and may be considered a value mineral in a subsequent process.

While any ore may be subjected to the processes and the collector compositions described herein, the disclosed subject matter typically pertains to base metal sulfide ores and precious metal ores. Examples of such ores include, but are not limited to, Cu—Mo ores, Cu—Au ores, primary Au ores, platinum group metal (PGM) ores, Cu ores, Ni ores, and complex polymetallic ores containing Pb, Zn, Cu and Ag.

In some embodiments, the collector compositions include a first collector and at least one second collector. One or more second collectors can be used in the composition. One or more neutral collectors, one or more organic ammonium compounds and combinations of one or more neutral collectors and one or more organic ammonium compounds can be used. In some embodiments, the collector composition may also include one or more additives.

The collector composition is preferably substantially free of water and substantially free of inorganic salts. The phrase "substantially free of water" as used herein encompasses compositions that include less than 10% water by weight. For instance, compositions that would be considered to be substantially free of water can include less than 10% water by weight, e.g., 7% wt.; 5% wt.; 4% wt.; 3.5% wt, 3.0% wt., 2.75% wt., 2.5% wt., 2.0% wt., 1.5% wt., 1.0% wt., 0.5% wt., 0.1% wt., 100 ppm, and the like. Compositions more preferably contain less than 1 wt. % of water, most preferably less than 0.1 wt. %.

The phrase "substantially free of inorganic salts" as used herein encompasses collector compositions that include less than 5% inorganic salt by weight. For instance, collector compositions that would be considered to be substantially free of inorganic salt can include less than 5% inorganic salt by weight, e.g., 4% wt.; 3.5% wt, 3.0% wt., 2.75% wt., 2.5% wt., 2.0% wt., 1.5% wt., 1.0% wt., 0.5% wt., 0.1% wt., 100 ppm, and the like.

In some embodiments, the collector compositions include a first collector comprising an organic primary, secondary, tertiary or quaternary ammonium salt of an organic sulfur-containing acid and at least one second collector. The organic sulfur-containing acid of the organic ammonium salt can be selected from hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids, hydrocarbyl trithiocarbonic acids, hydrocarbyl dithiophosphinic acids and hydrocarbyl monothiophosphinic acids. When the second collector is an organic ammonium salt of a sulfur-containing acid, the second collector is different from said first collector.

When the first collector comprises a primary or secondary organic ammonium salt of an organic sulfur-containing acid and the second collector is a neutral collector, the neutral collector is selected from dihydrocarbyl thionocarbamates, dihydrocarbyl thioureas, dihydrocarbyl sulfides, trihydrocarbyl dithiocarbamates, N-hydrocarbyl-S-hydrocarbyl dithiocarbamates, dihydrocarbyl guanidines, S-hydrocarbyl dithiophosphinates, S-hydrocarbyl dithiophosphates, S-hydrocarbyl mercaptobenzothiazoles, O-hydrocarbyl monothiophosphates, and O-hydrocarbyl monothiophosphinates.

In a preferred embodiment, the first collector in the collector composition preferably includes an organic ammonium salt of an organic sulfur-containing acid according to Formula I:

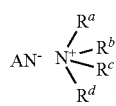

Formula I where: AN— is an anion from an organic sulfur-containing acid selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids, hydrocarbyl trithiocarbonic acids, hydrocarbyl dithiophosphinic acids and hydrocarbyl monothiophosphinic acids; $R^a$ is a hydrocarbyl group comprising from 1 to 16 carbon atoms, optionally substituted with a —OH group and/or with one or more —$(YR')_n$—YR" groups, wherein n=0 to 3, Y is O, NR'" or S, R' is an alkylene or arylene group containing from 1 to 12 carbon atoms, R" and R'" are, each independently, H or a hydrocarbyl group containing from 1 to 12 C atoms; and each of $R^b$, $R^c$ and $R^d$ are independently H or a hydrocarbyl group comprising from 1 to 16 carbon atoms, optionally substituted with a —OH group and/or with one or more —$(YR')_n$—YR" groups, wherein n=0 to 3, Y is O, NR'" or S, R' is an alkylene or arylene group containing from 1 to 12 carbon atoms, R" and R'" are, each independently, H or a hydrocarbyl group containing from 1 to 12 C atom; and wherein two or more of $R^a$, $R^b$, $R^c$ and $R^d$ may be linked to form a cyclic compound.

The organic sulfur-containing acid contains at least one ionizable —SH or —OH group attached to a carbon atom or a phosphorus atom. The organic ammonium salt may be a primary, secondary, tertiary or quaternary ammonium salt.

In certain embodiments, the first collector can be substantially free of water.

As used herein, the terms "hydrocarbyl group", "hydrocarbon group", "hydrocarbyl" and "hydrocarbon", encompass compounds containing hydrogen and carbon atoms, and can be substituted with one or more groups such as —OH groups and/or with one or more —$(YR')_n$—YR" groups, wherein n=0 to 3, Y is O, NR'" or S, R' is an alkylene or arylene group containing from 1 to 12 carbon atoms, R" and R'" are, each independently, H or a hydrocarbyl group containing from 1 to 12 C atoms. As used herein, the pluralized version of acid, i.e., acids, indicates that the compounds can be substituted or unsubstituted. The term "substituted" as used herein encompasses the replacement of one element, such as hydrogen, by another atom or a group containing one or more atoms or a heteroatom or a group containing one or more heteroatoms.

In another embodiment, in the organic ammonium cation of the first collector, the $R^a$ group is a hydrocarbyl group containing 1-16 carbon atoms, optionally substituted by a —OH group. However, it is contemplated that the $R^a$ group may also be a hydrocarbyl group containing 1-10 carbon atoms or a hydrocarbyl group containing 1-6 carbon atoms, optionally substituted by an —OH group. $R^a$ is preferably an alkyl group or an aryl group, and more preferably an alkyl group. $R^a$ is most preferably an alkyl group containing 1 to 10 carbon atoms, especially 1 to 5 carbon atoms, optionally substituted with a —OH group.

Each of the $R^b$, $R^c$ and $R^d$ groups of the organic ammonium cation may individually be H or a hydrocarbyl group containing 1-16 carbon atoms. In another example, each of the $R^b$, $R^c$ and $R^d$ groups of the organic ammonium cation may individually be H or a hydrocarbyl group containing 1-10 carbon atoms. Alternatively, in one example, each of the $R^b$, $R^c$ and $R^d$ groups may independently be H or a hydrocarbyl group containing 1-6 carbon atoms. $R^b$, $R^c$ and $R^d$ are preferably independently H or an alkyl group, more preferably containing 1-4 C atoms.

In a preferred embodiment, at least two of the $R^b$, $R^c$ and $R^d$ groups are hydrocarbyl groups. Further examples include at least two of $R^b$, $R^c$ and $R^d$ being alkyl groups having 1-16 carbon atoms or aryl groups having 6-12 carbon atoms. In a further example, at least two of $R^b$, $R^c$ and $R^d$ being alkyl groups having 1-10 carbon atoms. In another example, at least two of $R^b$, $R^c$ and $R^d$ are alkyl groups having 1-6 carbon atoms, more preferably having 1 to 4 carbon atoms or phenyl groups.

In another embodiment, $R^a$ is an alkyl group having 1-6 carbon atoms, more preferably 1-4 carbon atoms, optionally substituted with an —OH group and at least two of $R^b$, $R^c$ and $R^d$ being alkyl groups having 1-6 carbon atoms, more preferably having 1-4 carbon atoms.

The organic ammonium cation ($N^+R^aR^bR^cR^d$) of Formula I may be selected from choline, tetrahydrocarbyl ammonium, trihydrocarbyl ammonium, dihydrocarbyl ammonium, monohydrocarbyl ammonium, and mixtures thereof. Specific examples include, but are not limited to, methylammonium; ethylammonium; dimethylammonium; diethylammonium; trimethylammonium; N,N-dimethyl,N-propylammonium; N,N-dimethyl, N-ethyl ammonium; N-allyl-N,N-dimethylammonium; triethylammonium; tripropylammonium; tetrapropylammonium; tributylammonium; tetramethylammonium; tetraethylammonium; triethanolammonium; triethanolammonium; tripropanolammonium; trialkylammonium; choline; triphenylammonium; ethylene diammonium; 1,3-diammonium propane; hexamethylene diammonium; diethylene triammonium; triethylene triammonium; hexamethylene tetraamine; diphenylethyl ammonium and mixtures thereof. Ammonium salts derived from pyrrole and pyridine and the like may also be used. Preferred organic ammonium cations are tertiary ammonium cations, more preferably trimethylammonium; triethylammonium; tripropylammonium; tri-n-butylammonium, tri-isobutylammonium and ammonium salts derived from hexamethylene tetramine.

The first collector is preferably an organic tertiary or quaternary ammonium salt of an organic sulfur-containing acid, most preferably a tertiary ammonium salt.

The organic ammonium cation ($N^+R^aR^bR^cR^d$) of Formula I preferably has a molecular weight that does not exceed 300, more preferably not exceeding 250 and most preferably not exceeding 200. The organic ammonium cation ($N^+R^aR^bR^cR^d$) of Formula I preferably has a molecular weight of at least 32, more preferably of at least 60.

Hydrocarbyl dithiophosphoric acids are generally according to the general formula

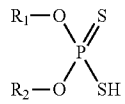

wherein R1 and R2 are hydrocarbyl groups with the proviso that R1 and R2 may be linked to form a cyclic compound. R1 and R2 are preferably and are each independently C2-C12 hydrocarbyl groups. Preferably, R1 and R2 are independently C2-C8 hydrocarbyl groups, more preferably C2-C4 hydrocarbyl groups. Examples of specific hydrocarbyl dithiophosphoric acids include diisobutyl dithiophosphoric acid, diethyl dithiophosphoric acid, diisoamyl dithiophosphoric acid, diisopropyl dithiophosphoric acid, dicresyl dithiophosphoric acid, di-sec-butyl dithiophosphoric acid, di-2-ethylhexyl dithiophosphoric acid, ethyl sec-butyl dithiophosphoric acid, and ethylamyl dithiophosphoric acid.

Hydrocarbyl monothiophosphoric acids are generally according to the general formula

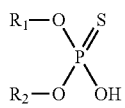

wherein R1 and R2 are each independently a C2-C12 hydrocarbyl group, with the proviso that R1 and R2 may be linked to form a cyclic compound. Preferably, R1 and R2 are each independently a C2-C8 hydrocarbyl group, more preferably C2-C4 hydrocarbyl groups. Examples of specific hydrocarbyl monothiophosphoric acids include diisobutyl monothiophosphoric acid, diethyl monothiophosphoric acid, diisoamyl monothiophosphoric acid, diisopropyl monothiophosphoric acid, dicresyl monothiophosphoric acid, di-sec-butyl monothiophosphoric acid, di-2-ethylhexyl monothiophosphoric acid, ethyl sec-butyl monothiophosphoric acid, and ethylamyl monothiophosphoric acid.

Hydrocarbyl dithiophosphinic acids are generally according to the general formula:

wherein R1 and R2 are each independently a C2-C12 hydrocarbyl group, optionally substituted with one or more —(YR')$_n$—YR"groups, wherein n=0 to 3, Y is O, NR'" or S, R' is an alkylene or arylene group containing from 1 to 12 carbon atoms (preferably an alkylene group containing from 1 to 4 carbon atoms or a phenylene group), R" and R'" are, each independently, H or a hydrocarbyl group containing from 1 to 12 C atoms (preferably an alkyl or aryl group containing from 1 to 6 carbon atoms), with the proviso that R1 and R2 may be linked to form a cyclic compound. Preferably, R1 and R2 are each independently a C2-C8 hydrocarbyl group, more preferably C2-C4 hydrocarbyl groups. Examples of specific hydrocarbyl dithiophosphinic acids include diisobutyl dithiophosphinic acid, diethyl dithiophosphinic acid, diisoamyl dithiophosphinic acid, diisopropyl dithiophosphinic acid, di-sec-butyl dithiophosphinic acid, ethyl sec-butyldithiophosphinic acid, di-2,4,4-trimethylpentyl-dithiophosphinic acid, 2,4,6 triisopropyl-3,5-dioxa-2-phosphacyclohexane 2-dithiophosphinic acid, and ethylamyl dithiophosphinic acid.

Hydrocarbyl dithiocarbamic acids comprise dihydrocarbyl dithiocarbamic acids and monohydrocarbyl dithiocarbamic acids and are generally according to the general formula:

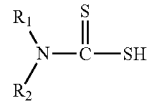

wherein R1 and R2 are each independently H or a C1-C12 hydrocarbyl group, with the proviso that at least one of R1 and R2 is not H and with the proviso that R1 and R2 may be linked to form a cyclic compound. Preferably, R1 and R2 are independently H or a C2-C8 hydrocarbyl group. More preferably, R1 and R2 are independently H or a C2-C4 hydrocarbyl group. Examples include diisobutyl dithiocarbamic acid, di-n-butyl dithiocarbamic acid, di-ethyl dithiocarbamic acid, di-isopropyl dithiocarbamic acid, di-benzyl dithiocarbamic acid, di-phenyl dithiocarbamic acid, di-octyl dithiocarbamic acid, mono-butyl dithiocarbamic acid, mono-ethyl dithiocarbamic acid, butylphenyl dithiocarbamic acid, ethylbutyl dithiocarbamic acid and the like.

Hydrocarbyl xanthic acids are generally according to the general formula:

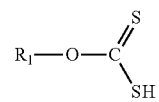

wherein R1 is a C2-C12 hydrocarbyl group. Preferably, R1 is a C2 to C5 hydrocarbyl group. Examples of specific hydrocarbyl xanthic acids include ethyl xanthic acid, n-butyl xanthic acid, iso-butyl xanthic acid, n-propyl xanthic acid, isopropyl xanthic acid, sec butyl xanthic acid, n-amyl xanthic acid, iso-amyl xanthic acid, 2 ethyl-hexyl xanthic acid, phenyl xanthic acid, benzyl xanthic acid.

Hydrocarbyl trithiocarbonic acids are generally according to the general formula

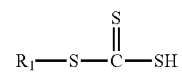

wherein R1 is a C2-C12 hydrocarbyl group. Preferably, R1 is a C4-C12 hydrocarbyl group. Examples of specific hydrocarbyl trithiocarbonic acids include butyl trithiocarbonic acid and dodecyl trithiocarbonic acid.

Hydrocarbyl monothiophosphinic acids are generally according to the general formula

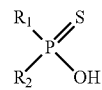

wherein R1 and R2 are each independently a C2-C12 hydrocarbyl group, optionally substituted with one or more —(YR')$_n$—YR"groups, wherein n=0 to 3, Y is O, NR'" or S, R' is an alkylene or arylene group containing from 1 to 12 carbon atoms (preferably an alkylene group containing from 1 to 4 carbon atoms or a phenylene group), R" and R'" are, each independently, H or a hydrocarbyl group containing from 1 to 12 C atom (preferably an alkyl or aryl group containing from 1 to 6 carbon atoms), with the proviso that R1 and R2 may be linked to form a cyclic compound. Preferably, R1 and R2 are each independently a C2-C8 hydrocarbyl group. Examples of specific hydrocarbyl monothiophosphinic acids include diisobutyl monothiophosphinic acid, diethyl monothiophosphinic acid, diisoamyl monothiophosphinic acid, diisopropyl monothiophosphinic acid, dicresyl monothiophosphinic acid, di-sec-butyl monothiophosphinic acid, di-2-ethylhexyl monothiophosphinic acid, ethyl sec-butyl monothiophosphinic acid, di-2,4,4-trimethylpentyl-monothiophosphinic acid, ethylamyl monothiophosphinic acid, and 2,4,6 triisopropyl-3,5-dioxa-2-phosphacyclohexane 2-monothiophosphinic acid.

Hydrocarbyl thioglycolic acids are generally according to the general formula

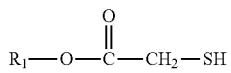

wherein R1 is a C2-C12 hydrocarbyl group. Preferably, R1 is C4 to C8 hydrocarbyl group. Examples of specific hydrocarbyl thioglycolic acids include butyl thioglycolic acid, octyl thioglycolic acid, and dodecyl thioglycolic acid.

Mercaptobenzothiazoles are generally according to the general formula

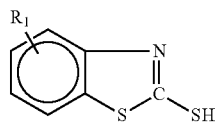

wherein R1 is H or a —O—(C1-C12 hydrocarbyl) group or a C2-C12 hydrocarbyl group. Preferably, R1 is H or a —O—C1 to C7 hydrocarbyl group. Examples of specific mercaptobenzothiazoles include 6-hexyl 2-mercaptobenzothiazole and 6-ethoxy 2-mercaptobenzothiazole. Preferred mercaptobenzothiazoles are selected from 2-mercaptobenzothiazole and 6-hydrocarbyl-2-mercaptobenzothiazoles.

Preferred organic sulfur-containing acids are selected from the group consisting of hydrocarbyl dithiophosphoric acids, hydrocarbyl monothiophosphoric acids, mercaptobenzothiazoles, hydrocarbyl xanthic acids and hydrocarbyl dithiocarbamic acids.

Examples of the first collector, include, but are not limited to, choline salt of diisobutyl dithiophosphoric acid, dimethylammonium salt of diisobutyl dithiophosphoric acid, trimethylammonium salt of mercaptobenzothiazole, choline salt of mercaptobenzothiazole, trimethylammonium salt of diisobutyl monothiophosphoric acid, choline salt of diisobutyl monothiophosphoric acid, triethylammonium salt of mercaptobenzothiazole, tripropylammonium salt of diisobutyl dithiophosphoric acid, triethylammonium salt of diethyl dithiocarbamic acid, tripropylammonium salt of dibutyl dithiocarbamic acid, trimethylammonium salt of diisobutyl dithiophosphoric acid, hexamethylene tetraammonium salt of diisobutyl dithiophosphoric acid, ethylammonium salt of diisobutyl dithiophosphoric acid, tetramethylammonium salt of diisobutyl dithiophosphoric acid, diethanolammonium salt of diisobutyl dithiophosphoric acid, triethanolammonium salt of butylthioglycolic acid, trimethylammonium salt of butyltrithiocarbonic acid, trimethylammonium salt of isobutyl xanthic acid, trimethylammonium salt of amyl xanthic acid, trimethylammonium salt of diisobutyl dithiophosphinic acid, trimethylammonium salt of monobutyl dithiocarbamic acid, tripropylammonium salt of monoethyl dithiocarbamic acid, hexamethylene tetraammonium salt of dibutyl dithiocarbamic acid, hexamethylene tetraammonium salt of dicresyl dithiophosphoric acid, hexamethylene tetraammonium salt of diethyl dithiocarbamic acid, hexamethylene tetraammonium salt of diisobutyl dithiophosphinic acid, hexamethylene tetraammonium salt of diisobutyl monothiophosphoric acid, hexamethylene tetraammonium salt of ethyl xanthic acid hexamethylene tetraammonium salt of isobutyl xanthic acid, hexamethylene tetraammonium salt of mercaptobenzothiazoles, triethylammonium salt of dicresyl dithiophosphoric acid, triethylammonium salt of diisobutyl dithiophosphinic acid, triethylammonium salt of diisobutyl dithiophosphoric acid, trimethylammonium salt of dibutyl dithiocarbamic acid, trimethylammonium salt of dicresyl dithiophosphoric acid, trimethylammonium salt of dicresyl monothiophosphoric acid, trimethylammonium salt of dicresyl monothiophosphinic acid, trimethylammonium salt of diethyl dithiocarbamic acid, trimethylammonium salt of diethyl dithiophosphinic acid, and trimethylammonium salt of ethyl xanthic acid.

The physical state of the first collector is dependent on the organic ammonium cation and the sulfur-containing anion. For instance, trimethylammonium salt of diisobutyl dithiophosphoric acid and triethylammonium salt of diisobutyl dithiophosphoric acid are solids. Most other salts are liquid.

The collector compositions according to the present invention also include a second collector. The second collector can be selected from neutral collectors or from organic ammonium salts of organic sulfur-containing acids, especially from those according to Formula I.

The second collector is preferably substantially free of water.

Neutral collectors (also sometimes referred to as "oily collectors" or "charge neutral oily collectors") are compositions that do not carry a charge ("charge neutral") and are typically organic sulfur-containing compounds that may be substantially insoluble in water under normal operating conditions of a froth flotation process. In some embodiments, the neutral collectors do not contain a ionizable —OH or —SH group. In another embodiment, the neutral collectors are substantially free of water. Neutral collectors are typically in liquid form.

Examples of neutral collectors include, but are not limited to, hydrocarbyloxycarbonyl hydrocarbyl thionocarbamates, hydrocarbyloxycarbonyl hydrocarbyl dithiocarbamates, hydrocarbyloxycarbonyl hydrocarbyl thioureas, hydrocarbyloxycarbonyl hydrocarbyl trithiocarbonates, dihydrocarbyl sulfides, dihydrocarbyl xanthates, trihydrocarbyl dithiocarbamates, N-hydrocarbyl-S-hydrocarbyl dithiocarbamates, dihydrocarbyl thionocarbamates, dihydrocarbyl thioureas, dihydrocarbyl xanthogen formates, dihydrocarbyl thioglycolates, dihydrocarbyl trithiocarbonates, S-hydrocarbyl dithiophosphates, S-hydrocarbyl dithiophosphinates, S-hydrocarbyl mercaptobenzothiazoles, O-hydrocarbyl monothiophosphates, O-hydrocarbyl monothiophosphinates and dihydrocarbyl guanidines.

Preferred neutral collectors are those wherein the hydrocarbyl groups contain from 1 to 16 carbon atoms, more specifically from 2 to 6 carbon atoms.

Preferred neutral collectors include, for example, the following compounds, wherein the definition of hydrocarbyl is the same as above: S-hydrocarbyl O,O'-dihydrocarbyl dithiophosphates; S-hydrocarbyl, N,N-dihydrocarbyl dithiocarbamates; S-hydrocarbyl, N-hydrocarbyl dithiocarbamates; S-hydrocarbyl xanthate esters; S-hydrocarbyloxycarbonyl, O-hydrocarbyl xanthates; dihydrocarbyl xanthogen formates; N-hydrocarbyloxycarbonyl, S-hydrocarbyl dithiocarbamates; S,S'-dihydrocarbyl trithiocarbonates; N,N'-dihydrocarbyl thioureas; S-hydrocarbyl mercaptobenzothiazoles; N-allyl, O-hydrocarbyl thionocarbamates; S-hydrocarbyl P,P dihydrocarbyl dithiophosphinates; dihydrocarbyl sulfides; N-hydrocarbyloxycarbonyl, O-hydrocarbyl thionocarbamates; dihydrocarbyl thionocarbamates; and N-hydrocarbyloxycarbonyl, N'-hydrocarbyl thioureas.

Specific examples of neutral collectors are N-hydrocarbyloxycarbonyl, S-hydrocarbyl dithiocarbamates, N-n-butoxycarbonyl O-n-butyl thiocarbamate, N-allyl, O-isobutyl thionocarbamates, S-allyl, O-amyl xanthate ester, and O-isopropyl N-ethyl thionocarbamate.

In general, the manufacture of collector compositions that include the first collector as described above and a neutral collector as the second collector requires a reduced number of steps and lower cycle time in reactors as compared to formulations that include sodium (Na) salts instead of the organic ammonium salts. Since less mixing is needed to make the collector compositions that include the first collector as described above and a neutral collector as the second collector, the amount of energy consumed is also less compared to formulations that include sodium (Na) salts.

Additionally, as compared to collector compositions that include Na salts, the organic collector compositions including the first collector as described above and a neutral collector have higher activity, which results in lower shipping costs. The lower shipping costs are due to the collector compositions being more concentrated as compared to those containing sodium salts and water.

In general, the first collectors that are described above display excellent physical compatibility with neutral collectors. The physical stability of collector compositions that include the first collector together with a neutral collector allows them to be handled in an easy manner. Moreover, such collectors are chemically stable and do not release toxic gases or fumes and do not require the use of hazardous diluents and coupling agents.

When the first collector of the collector composition includes a primary or secondary ammonium salt, the neutral collector is one that does not react with the organic ammonium salts of the first collector. Examples of neutral collectors that are compatible with primary and secondary ammonium salts of organic sulfur-containing acids are dihydrocarbyl thionocarbamates, dihydrocarbyl thioureas, dihydrocarbyl sulfides, trihydrocarbyl dithiocarbamates, N-hydrocarbyl-S-hydrocarbyl dithiocarbamates, dihydrocarbyl guanidines, S-hydrocarbyl dithiophosphinates, S-hydrocarbyl dithiophosphates, S-hydrocarbyl mercaptobenzothiazoles, O-hydrocarbyl monothiophosphates, and O-hydrocarbyl monothiophosphinates. In one specific example, when the first collector includes a primary or secondary ammonium salt, the neutral collector may be selected from dihydrocarbyl thionocarbamates or hydrocarbyl allyl thionocarbamates.

Examples of dihydrocarbyl sulfides are ethyl octyl sulfide and dibutyl sulfide. Examples of dihydrocarbyl thionocarbamates are O-isopropyl, N-ethyl thionocarbamate; O-ethyl, N-isopropyl thionocarbamate; O-ethyl, N-isobutyl thionocarbamate; O-isobutyl, N-ethyl thionocarbamate, N-allyl, O-isobutyl thionocarbamate, O-allyl, N-butyl thionocarbamate, and di-isopropyl thionocarbamate. Examples of dihydrocarbyl thioureas are 1,3-diphenyl-2-thiourea and 1-butyl-3-propyl-2-thiourea. An example of a dihydrocarbyl guanidine is 1,3 diphenyl guanidine.

When the first collector includes a tertiary or quaternary ammonium salt, there is less chance of interaction between the salts and the neutral collector. Accordingly, a wider variety of neutral collectors can be used in combination with tertiary or quaternary ammonium salts. For example, the neutral collector N-n-butoxycarbonyl, O-n-butyl thionocarbamate does not interact with the trimethylammonium salt of diisobutyl dithiophosphoric acid, but may react with the methylammonium salt of the same compound.

In another embodiment of the collector compositions described herein, the second collector is selected from organic ammonium salts of sulfur-containing acids, more specifically one according to Formula I. In general, collector compositions having two different organic ammonium salts demonstrate some advantages, such as lower viscosity during manufacture, improved metallurgical performance and have a higher level of activity when compared to previously known collectors that contain Na salts. Higher activity results in products that are easier to handle and ship as compared to collector compositions that contain Na salts. Easier handling may allow for lower shipping costs as compared to collector compositions containing Na salts.

In certain embodiments, the first and the second collectors are mixed together just prior to the addition to the froth flotation process. In another embodiment, the first and second collectors are mixed prior to shipment and arrive to the user as a mixed product. In yet another embodiment, the first and second collectors are added to the froth flotation process separately.

The sulfur-containing acid in the second collector is defined in the same manner as the sulfur-containing acid in the first collector. When both the first and the second collectors are selected from organic ammonium salts of a sulfur-containing acid, the second collector is different from the first collector. In some embodiments, the first collector and the second collector have different organic ammonium cations.

When the first collector and the second collector have different organic ammonium cations, the first collector and the second collector can have the same sulfur-containing anion. For instance, in one embodiment, the collector composition includes triethylammonium salt of diisobutyl dithiophosphoric acid as the first collector and tripropylammonium salt of diisobutyl dithiophosphoric acid as second collector.

In another embodiment, the first collector and the second collector have different sulfur-containing anions. When the first collector and the second collector have different sulfur-containing anions, the first collector and the second collector can have the same organic ammonium cation. For instance, in one embodiment, the collector composition includes tripropylammonium salt of diisobutyl dithiophosphoric acid as the first collector and tripropylammonium salt of diethyl dithiocarbamic acid as second collector.

In a further embodiment, the first collector and the second collector include different sulfur-containing anions and different organic ammonium cations. For instance, in one embodiment, the first collector is triethylammonium salt of diisobutyl dithiophosphoric acid and the second collector is trimethylammonium salt of dicresyl monothiophosphoric acid.

In general, the first and second collectors are present in the collector compositions in amounts and ratios that are economically feasible as well as effective to the recovery of the value minerals. The amount of the first collector present in the collector composition can vary from about 1 wt. % to about 99 wt. % based on the total weight of the collector composition. In certain embodiments, the amount of the first collector present in the collector composition is between about 30 wt. % and about 70 wt. % based on the total weight of the collector composition.

The total amount of the second collector (present in the collector compositions as one or more other collector) can vary from about 1 wt. % to about 99 wt. % based on the total weight of the collector composition. In one embodiment, the amount of the second collector present in the collector composition is between about 30 wt. % and about 70 wt. %, based on the total weight of the collector composition.

Accordingly, the amount of the first and the second collector present in the collector composition can vary between about 1 wt. % and about 99 wt. % based on the total weight of the collector composition. A particular embodiment of the collector composition includes from about 30 wt. % to about 70 wt. % of the first and second collectors, based on the total weight of the collector composition.

In certain embodiments of the collector composition, the first collector and the second collector or second collectors are present in a weight ratio between 1:99 to 99:1. In another embodiment of the collector composition, the first collector and the second collector(s) are present in a weight ratio between 25:75 to 75:25. In yet a further embodiment of the collector composition, the first collector and the second collector(s) are present in a weight ratio between 40:60 to 60:40.

As mentioned above, in some embodiments, the composition may optionally include one or more additives. Many such additives are known to those of skill in the froth flotation art and need not be further described in detail herein. Certain additives may include, for example, one or more of hydrocarbon oils, surfactants, aliphatic alcohols, glycols, glycol ethers and non-aqueous solvents.

The amount and type of additives present in the collector composition will vary depending on one or more of the following variables: the type of first and second collectors, the amount of the first and the second collectors, the type of ore, the value mineral, and the like. The person of ordinary skill in the art will be able to determine such values based on no more than routine experimentation. In one embodiment, the total amount of additives present in the collector composition is between about 1 wt. % and about 95 wt. % based on the total weight of the collector composition. In another embodiment, the total amount of additives present in the collector composition is between about 1 wt. % and about 50 wt. % based on the total weight of the collector composition.

The compounds of organic ammonium salt of an organic sulfur-containing acid as described herein prove useful as value mineral collectors and may be used in methods for recovering at least one value mineral from an ore. In general, the organic ammonium salt of an organic sulfur-containing acid are utilized as collectors in froth flotation processes by adding a beneficiating amount of the collector (i.e., an amount of collector sufficient to effectively separate the value minerals from the non-value minerals) to one or more stages of the froth flotation process. One example of a froth flotation process stage includes crushing an ore to form crushed ore (referred to herein as the "pre-grinding" or the "pre-grind" stage), and then grinding the crushed ore particles in a grinding mill to form ground ore. A slurry of water and ground ore is formed. The steps of grinding the ore and forming the slurry may be collectively referred to as the "grinding stage". The slurry containing the ground ore is then sent to the "conditioning stage" where the ground ore is conditioned in a conditioner. The ground ore is subjected to a flotation process by passing air through the slurry in floatation cells or a bank of flotation cells to cause floatation of the desired minerals in a froth. The desired minerals, i.e., the value minerals, are collected ("recovered") from the froth in launders (referred to as the "flotation stage").

As one of ordinary skill in the art will appreciate, a froth flotation process may include more than one stage of grinding, conditioning and flotation. Thus, the flotation concentrate from the first stage (referred to as "roughers" or "rougher-scavengers") may be ground further and refloated in a circuit referred to as "cleaners". The cleaners may subject the concentrate of the first stage to further grinding, conditioning and flotation stages. Alternatively, the concentrate from the first stage may be refloated without further grinding.

The tails from the cleaners may be refloated in a circuit referred to as "cleaner-scavengers". It is envisioned that the disclosed subject matter encompasses addition of froth phase modifiers, monovalent ion modifier enhancing agents and collector compositions at any stage of the process, i.e., addition of the froth phase modifier (and/or monovalent ion modifier enhancing agent and/or collector) in some instance may be done until the second (or third) grinding stage, conditioning stage, or flotation stage.

Flotation reagents, which include the collector compositions described herein as well as, for example, frothers, pH regulators, froth phase modifiers, dispersants, depressants, and the like, may be added to the crushed ore, ground ore and/or slurry, during the process at any or all of the stages of the froth flotation process. Typically the flotation reagents, such as the collector compositions described herein, are intermixed with at least one of the crushed ore, the ground ore, the slurry, and combinations thereof. The term "intermixed" or any variation thereof, as used herein, means any method that can be used to bring two or more items or compounds together and encompasses adding, mixing, combining, incorporating, blending and the like. Similarly, the term "added" or any variation thereof, as used herein, means any method that can be used to bring two or more items or compounds together and encompasses adding, intermixing, mixing, combining, incorporating, blending and the like.

The collector compositions described herein are added to processes for recovering a value mineral from an ore in an amount that is effective ("effective amount" or "beneficiating amount") to recover the value mineral and/or affect the desired separation. The effective amount of the collector composition may depend on a variety of factors, including the process used, the ore used, the contents of the collector composition, and the like. The person of ordinary skill in the art will be able to determine such values based on no more than routine experimentation. In one embodiment the effective amount of the collector composition added to the process is from about 0.5 gram per ton (g/t) to about 500 g/t. In another embodiment, the effective amount of the collector composition added to the process is from about 1 g/t to about 300 g/t. In a further embodiment, the effective amount of the collector composition added to the process is from about 2 g/t to about 200 g/t. In yet another embodiment, the effective amount of the collector composition added to the process is from about 5 g/t to about 100 g/t. In still a further embodiment, the effective amount of the collector composition added to the process is from about 5 g/t to about 20 g/t.

The collector compositions described herein are typically added to processes in a liquid form.

EXAMPLES

The following examples are provided to assist one skilled in the art to further understand certain embodiments of the present invention. These examples are intended for illustration purposes and are not to be construed as limiting the scope of the various embodiments of the present invention.

Unless otherwise specifically noted, the following notations are used in the Examples below: "percent," "%", "weight %" and "wt. %" denotes weight percent, "g" denotes gram, "C." denotes degrees Celsius, "g/t" denotes gram per ton, "min" denotes "minutes", "rec" and "Rec" denote recovery of value mineral in concentrate, "S rec" represents the total recovery of all the sulfur, "coll" stands for collector, "rpm" stands for revolutions per minute, "kg" is kilogram, "ppm" is parts per million on a mass basis (also equal to g/t), "ml" is milliliter, and "L" is liter.

Example 1

Preparation of Ethylammonium Salt of Diisobutyldithiophosphoric Acid

Preparation of ethylammonium salt of diisobutyl dithiophosphoric acid is as follows: 130 grams (0.54 mole) of diisobutyl dithiophosphoric acid is charged into a jacketed pressure reactor. The system is bubbled through with nitrogen for 20 min and 26 grams (0.58 mole) of liquefied ethylamine is added to the addition funnel and the entire system is then sealed under nitrogen. Then, with the system monitored by a pressure gauge and thermometer, ethylamine is added drop wise. The reaction temperature is kept under 50° C. and pressure under 10 pounds per square inch ("psi"). After the addition is over, the system is brought to 50° C. through the jacket by a heating circulator. The reaction temperature is kept at 50° C. for 1 hour. The product is then discharged. The acid number (normally below 30) and iodine number (between 40-44) were measured to check the acidity and percent dithiophosphoric acid. The product purity (ranging between 88-95%) is measured by liquid chromatography-mass spectrometry ("LC-MS") and nuclear magnetic resonance ("NMR").

Example 2

Preparation of Diethylammonium Salt of Diisobutyldithiophosphoric Acid

Preparation of diethylammonium salt of diisobutyldithiophosphoric acid is as follows: 130 grams (0.54 mole) of diisobutyl dithiophosphoric acid is charged into a jacketed pressure reactor. The system is bubbled through with nitrogen for 20 min and 43 grams (0.58 mole) of diethylamine is added to the addition funnel and the entire system is then sealed under nitrogen. Then, with the system monitored by a pressure gauge and thermometer, diethylamine is then added drop wise and the reaction temperature kept under 50° C. and pressure under 10 psi. After the addition is over, the system is brought to 50° C. through the jacket by a heating circulator. The reaction temperature is kept at 50° C. for 1 hour. The product is then discharged. The acid number (normally below 30) and iodine number (between 40-44) were measured to check the acidity and percent dithiophosphoric acid. The product purity (ranging between 88-95%) is measured by LC-MS and NMR.

Example 3

Preparation of Triethylammonium Salt of Diisobutyl Dithiophosphoric Acid

Preparation of triethylammonium salt of diisobutyl dithiophosphoric acid is as follows: 130 grams (0.54 mole) of diisobutyl dithiophosphoric acid is charged into a jacketed pressure reactor. The system is bubbled through with nitrogen for 20 min and 55.5 grams (0.55 mole) of triethylamine is added to the addition funnel and the entire system is under nitrogen. Then, with the system monitored by a pressure gauge and thermometer, triethylamine is then added drop wise and the reaction temperature is kept under 50° C. and pressure under 10 psi. After the addition is over, the system is brought to 50° C. through the jacket by a heating circulator. The reaction temperature is kept at 50° C. for 1 hour. The product is then discharged. The acid number (normally below 30) and iodine number (between 40-43) are measured to check the acidity and percent dithiophosphoric acid. The product purity (ranging between 88-95%) is measured by LC-MS and NMR.

Example 4

Preparation of Tetraethylammonium Salt of Diisobutyl Dithiophosphoric Acid

Preparation of tetraethylammonium salt of diisobutyl dithiophosphoric acid is as follows: 264 grams (0.50 mole) of sodium diisobutyl dithiophosphate is charged into a jacketed reactor. The system is bubbled through with nitrogen for 20 min and 165.7 grams (0.50 mole) of tetraethylammonium chloride (50% solution in water) is added slowly through an addition funnel to the DTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that filtration is applied to remove the magnesium sulfate and the toluene is stripped out at 20 mm Hg/80° C. condition to obtain final product. The product is then discharged. The product purity (ranging between 80-90%) is measured by LC-MS and NMR.

Example 5

Preparation of Trimethylammonium Salt of Diisobutyl Dithiophosphoric Acid

Preparation of trimethylammonium salt of diisobutyl dithiophosphoric acid is as follows: 130 grams (0.54 mole) of diisobutyl dithiophosphoric acid is charged into a jacketed pressure reactor. The system is bubbled through with nitrogen for 20 min and 35 grams (0.59 mole) of liquefied trimethylamine is added to the addition funnel and the entire system is then sealed under nitrogen. Then, with the system monitored by a pressure gauge and thermometer, trimethylamine is then added drop wise and kept the reaction temperature under 50° C. and pressure under 10 psi. After the addition is over, the system is brought to 50° C. through the jacket by a heating circulator. The reaction temperature is kept at 50° C. for 1 hour. The product is then discharged. The acid number (normally below 30) and iodine number (between 40-43) are measured to check the acidity and percent dithiophosphoric acid. The product purity (ranging between 88-95%) is measured by LC-MS and NMR.

Example 6

Preparation of Tripropylammonium Salt of Diisobutyl Dithiophosphoric Acid

Preparation of tripropylammonium salt of diisobutyl dithiophosphoric acid is as follows: 130 grams (0.54 mole) of diisobutyl dithiophosphoric acid is charged into a jacketed pressure reactor. The system is bubbled through with nitrogen for 20 min and 77.2 grams (0.54 mole) of tripropylamine is added to the addition funnel and the entire system is under nitrogen. Then, with the system monitored by a thermometer, tripropylamine is added drop wise and the reaction temperature is kept under 50° C. After the addition is over, the system is brought to 50° C. through the jacket by a heating circulator. The reaction temperature is kept at 50° C. for 1 hour. The product is then discharged. The acid number (normally below 30) and iodine number (between 40-43) are measured to check the acidity and percent dithiophosphoric acid. The product purity (ranging between 88-95%) is measured by LC-MS and NMR.

Example 7

Preparation of Choline Salt of Diisobutyl Dithiophosphoric Acid

Preparation of choline salt of diisobutyl dithiophosphoric acid is as follows: 264 grams (0.50 mole) of sodium diisobutyl dithiophosphate is charged into a jacketed reactor. The system is bubbled through with nitrogen for 20 min and 139.6 grams (0.50 mole) of choline chloride (50% solution in water) is added slowly through an addition funnel to the DTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that, filtration is applied to remove the magnesium sulfate and the toluene is stripped out at 20 mm Hg/80° C. condition to obtain a final product. The product is then discharged. The product purity (ranging between 80-90%) is measured by LC-MS and NMR.

Example 8

Preparation of Choline Salt of Mercaptobenzothiazole

Preparation of choline salt of mercaptobenzothiazole is as follows: 83.6 grams (0.50 mole) of powder 2-mercaptobenzothiazole is suspended in 100 ml absolute ethanol and neutralized by mixing 134.4 grams (0.50 mole) of choline hydroxide (45 wt. % in methanol) at room temperature under nitrogen. Then the mixture is heated to 50° C. for 1 hour. The solution is then stripped under vacuum to remove the excess ethanol/methanol to obtain final product. The acid number (normally below 30) is measured to check the acidity. The product purity (ranging between 80-90%) is measured by LC-MS and NMR.

Example 9

Preparation of Triethylammonium Salt of Mercaptobenzothiazole

Preparation of triethylammonium salt of mercaptobenzothiazole is as follows: 83.6 grams (0.50 mole) of powder 2-mercaptobenzothiazole is suspended in 100 ml absolute ethanol and neutralized by mixing 50.5 grams (0.50 mole) of triethylamine at room temperature under nitrogen. Then the mixture is heated to 50° C. for 1 hour. The solution is then stripped under vacuum to remove the excess ethanol/methanol to obtain final product. The acid number (normally below 30) is measured to check the acidity. The product purity (ranging between 80-90%) is measured by LC-MS and NMR.

Example 10

Preparation of Tributylammonium Salt of Mercaptobenzothiazole

Preparation of tributylammonium salt of mercaptobenzothiazole is as follows: 83.6 grams (0.50 mole) of powder 2-mercaptobenzothiazole is suspended in 100 ml absolute ethanol and neutralized by mixing with 92.7 grams (0.50 mole) of tributylamine at room temperature under nitrogen. Then the mixture is heated to 50° C. for 1 hour. The solution is then stripped under vacuum to remove the excess ethanol to obtain final product. The acid number (normally below 30) is measured to check the acidity. The product purity (ranging between 80-90%) is measured by LC-MS and NMR.

Example 11

Preparation of triethylammonium N,N-diethyl dithiocarbamate

Preparation of triethylammonium salt of diethyl dithiocarbamate is as follows: 76 grams (1 mole) carbon disulfide and 101 grams (1 mole) triethylamine are mixed at 10° C. under nitrogen. To the mixture is added in slowly 80.5 grams (1.1 mole) diethylamine drop wise and maintain the temperature below 30° C. Then the mixture is heated to 50° C. for 1 hour. The solution is then stripped out under vacuum to remove the excess amine and for the removal of low volatiles to obtain final product. The acid number (normally below 30) is measured to check the acidity. The product purity (ranging between 85-95%) is measured by LC-MS and NMR.

Example 12

Preparation of tripropylammonium N,N-diethyl dithiocarbamate

Preparation of tripropylammonium salt of diethyl dithiocarbamateis as follows: 76 grams (1 mole) carbon disulfide and 143 grams (1 mole) tripropylamine are mixed at 10° C. under nitrogen. 80.5 grams (1.1 mole) diethylamine is added slowly and drop wise to the mixture and the mixture is maintained at a temperature below 30° C. Then the mixture is heated to 50° C. for 1 hour. The solution is then stripped out under vacuum to remove the excess amine and for the removal of low volatiles to obtain final product. The acid number (normally below 30) is measured to check the acidity. The product purity (ranging between 85-95%) is measured by LC-MS and NMR.

Example 13

Preparation of Choline Salt of Diisobutyl Monothiophosphoric Acid

Preparation of choline salt of diisobutyl monothiophosphoric acid ("MTP acid") is as follows: 248 grams (0.50 mole) of sodium diisobutyl monothiophosphate (50% solution in water) is charged into a jacketed reactor. The system is bubbled through with nitrogen for 20 min and 134.4 grams (0.50 mole) of choline chloride (50 wt. % in water) is added slowly through an addition funnel to the MTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that, filtration is applied to remove the magnesium sulfate and the toluene is stripped out at 20 mm Hg/80° C. condition to obtain final product. The product is then discharged. The product purity (ranging between 80-90%) is measured by LC-MS and NMR.

Example 14

Preparation of Triethylammonium Salt of Diisobutyl Monothiophosphoric Acid

Preparation of triethylammonium salt of diisobutyl monothiophosphoric acid is as follows: 248 grams (0.50 mole) of sodium diisobutyl monothiophosphate (50% solution in water) is charged into a jacketed reactor. The system is bubbled through with nitrogen for 20 min and 50.5 grams (0.50 mole) of triethylamine is added slowly through an addition funnel to the MTP acid. The reactor is heated at 50 to 60° C. for 1 hour with vigorous agitation. Then, 50 ml of toluene is added to dissolve the product and the aqueous layer is separated and drained out. The toluene solution is then washed with 50×2 ml water and dried with magnesium sulfate. After that, filtration is applied to remove the magnesium sulfate and the toluene is stripped out at 20 mm Hg/80° C. condition to obtain final product. The product is then discharged. The product purity (ranging 80-90%) is measured by LC-MS and NMR.

Examples 15-18

Recovery of Mineral Values from a Base Metal (Copper) Containing Ore Body

An ore sample containing Cu (0.56%) is beneficiated by froth flotation. In each test, 1000 g of ore sample is ground for 8.5 min. in a mild steel rod mill containing a 10 kg rod charge and approximately 667 ml of water resulting in ground ore slurry with a particle size distribution of approximately 80% passing 106 microns. Lime is added to the mill to achieve a target pH of approximately 10.5 in the flotation stage. The slurry after grinding is then transferred to a 2.5 L Denver flotation cell and water is added to adjust the solids density to 33%. The slurry is agitated at 1200 rpm in the cell. The collector is added in one addition at 5 g of active collector per ton of ore in the conditioning stage. In all tests, the frother used is PBM 604 frother, available from Cytec Industries Inc., USA, which is added at a dose of 30 g/t. Flotation is conducted for 9 min. The results are presented in Table 1.

TABLE 1

Cu Ore

| Example No* | Coll1 | Coll2 | Ratio Coll 1:Coll 2 | Total Coll Dosage, g/t | Cu Rec., % |
|---|---|---|---|---|---|
| 15 | Ch-DIBDTP | None | 100:0 | 5 | 83.6 |
| 16C | None | NBCNBTC | 0:100 | 5 | 80.9 |
| 17 | Ch-DIBDTP | NBCNBTC | 25:75 | 5 | 84.0 |
| 18 | Ch-DIBDTP | NBCNBTC | 75:25 | 5 | 83.9 |

C: Comparative
Ch-DIBDTP: Choline salt of Diisobutyl Dithiophosphoric acid
NBCNBTC: N-n-butoxycarbonyl O-n-butyl thionocarbamate Examples 19-22

Recovery of Mineral Values from a Base Metal (Copper) Containing Ore Body

An ore sample containing Cu (0.56%) is beneficiated by froth flotation. In each test, 1000 g of ore sample is ground for 8.5 min. in a mild steel rod mill containing a 10 kg rod charge and approximately 667 ml of water resulting in ground ore slurry with a particle size distribution of approximately 80% passing 106 microns. Lime is added to the mill to achieve a target pH of approximately 10.5 in the flotation stage. The slurry after grinding is then transferred to a 2.5 L Denver flotation cell and water is added to adjust the solids density to 33%. The slurry is agitated at 1200 rpm in the cell. The collector is added in one addition at 5 g of active collector per ton of ore in the conditioning stage. In all tests, the frother used is PBM 604 frother, available from Cytec Industries Inc., Stamford, Conn., USA, which is added at a dose of 30 g/t. Flotation is conducted for 9 min. The results are presented in Table 2.

TABLE 2

Cu Ore

| Example No* | Coll1 | Coll2 | Ratio Coll 1:Coll 2 | Total Coll Dosage, g/t | Cu Rec., % |
|---|---|---|---|---|---|
| 19C | None | IPETC | 0:100 | 5 | 80.0 |
| 20C | Ch-DIBDTP | None | 100:0 | 5 | 83.6 |
| 21 | Ch-DIBDTP | IPETC | 25:75 | 5 | 85.2 |
| 22 | Ch-DIBDTP | IPETC | 50:50 | 5 | 84.0 |

C: Comparative
Ch-DIBDTP: Choline salt of Diisobutyl Dithiophosphoric acid
IPETC: O-isopropyl N-ethyl thionocarbamate Examples 23-25

Recovery of Mineral Values from a Base Metal (Nickel) Containing Ore Body

An ore sample containing Ni (1.6%) is beneficiated by froth flotation. In each test, 500 g of ore sample is ground for 6 min in a mild steel rod mill containing a 9.2 kg rod charge and approximately 333 ml of water resulting in ground ore slurry with a particle size distribution of approximately 56% passing 75 microns. Lime is added to the mill to achieve a target pH of approximately 9.0 in the flotation stage. The slurry after grinding is then transferred to a 1.2 L Denver flotation cell and water is added to adjust the solids density to 33%. The slurry is agitated at 1000 rpm in the cell. The collector is added in one addition, meaning that both collectors 1 and 2 are added at the same time at 20 g/t of ore in the conditioning or grinding stage. In all tests, the frother used is Dowfroth 250, available from the Dow Chemical Company, USA, which is added at a dose of 25 g/t. It is noted that Dowfroth 250 may be substituted with Aerofroth 68, available from Cytec Industries, Inc., USA. Flotation is conducted for 7 min. The results are presented in Table 3. When two collectors are used, i.e., collector 1 and collector 2, the ratio of collector 1 to collector 2 is 1:1, i.e., equal amounts of each are used.

TABLE 3

Ni ore

| Example No* | Coll1 | Coll2 | Total CollDosage, g/t | Ni Rec., % |
|---|---|---|---|---|
| 23C | Na DIBDTP | None | 20 | 71.3 |
| 24 | TEA-DIBDTP | None | 20 | 72.3 |
| 25 | TPA-DIBDTP | TEA-DIBDTP | 20 | 72.8 |

C: Comparative
Na DIBDTP: Sodium salt of Di-isobutyl Dithiophosphoric acid
TEA-DIBDTP: Triethylammonium salt of Diisobutyl Dithiophosphoric acid
TPA-DIBDTP: Tripropylammonium salt of Diisobutyl Dithiophosphoric acid

Examples 25-27

Recovery of Mineral Values from a Base Metal (Nickel) Containing Ore Body

An ore sample containing Ni (1.6%) is beneficiated by froth flotation. In each test, 500 g of ore sample is ground for 6 min. in a mild steel rod mill containing a 9.2 kg rod charge and approximately 333 ml of water resulting in ground ore slurry with a particle size distribution of approximately 56% passing 75 microns. Lime is added to the mill to achieve a target pH of approximately 9.0 in the flotation stage. The slurry after grinding is then transferred to a 1.2 L Denver flotation cell and water is added to adjust the solids density to 33%. The slurry is agitated at 1000 rpm in the cell. The collector is added in one addition at 15 or 30 g/t of ore in the conditioning or grinding stage. In all tests, the frother used is Dowfroth 250, available from the Dow Chemical Company, USA, which is added at a dose of 25 g/t. It is noted that Dowfroth 250 may be substituted with Aerofroth 68, available from Cytec Industries, Inc., USA Flotation is conducted for 7 min. The results are presented in Table 4. When two collectors are used, i.e., collector 1 and collector 2, the ratio of collector 1 to collector 2 is 1:11 i.e., equal amounts of each are used.

TABLE 4

Ni ore

| Example No* | Coll1 | Coll2 | Total CollDosage, g/t | Ni Rec., % |
|---|---|---|---|---|
| 25C | TPA-DEDTC | None | 20 | 69.9 |
| 26C | TEA-DEDTC | None | 20 | 69.2 |
| 27 | TPA-DEDTC | TEA-DEDTC | 20 | 75.3 |

TEA-DEDTC: Triethylammonium salt of Diethyl Dithiocarbamic acid
TPA-DEDTC: Tripropylammonium salt of Diethyl Dithiocarbamic acid

Examples 28-29

Recovery of Mineral Values from a Base Metal (Nickel) Containing Ore Body

An ore sample containing Ni (1.6%) is beneficiated by froth flotation. In each test, 500 g of ore sample is ground for 6 min. in a mild steel rod mill containing a 9.2 kg rod charge and approximately 333 ml of water resulting in ground ore slurry with a particle size distribution of approximately 56% passing 75 microns. Lime is added to the mill to achieve a target pH of approximately 9.0 in the flotation stage. The slurry after grinding is then transferred to a 1.2 L Denver flotation cell and water is added to adjust the solids density to 33%. The slurry is agitated at 1000 rpm in the cell. The collector is added in one addition at 15 or 30 g/t of ore in the conditioning or grinding stage. In all tests, the frother used is Dowfroth 250, available from the Dow Chemical Company, USA, which is added at a dose of 25 g/t. It is noted that Dowfroth 250 may be substituted with Aerofroth 68, available from Cytec Industries, Inc., USA Flotation is conducted for 7 min. The results are presented in Table 5. When two collectors are used, i.e., collector 1 and collector 2, the ratio of collector 1 to collector 2 is 1:11 i.e., equal amounts of each are used.

TABLE 5

Ni ore

| Example No* | Coll1 | Coll2 | Total Coll Dosage, g/t | Ni Rec., % |
|---|---|---|---|---|
| 28C | Na DIBDTP | Na DEDTC | 20 | 72.0 |
| 29 | TPA DIBDTP | TPA DEDTC | 20 | 73.9 |

Na DIBDTP: Sodium salt of Di-isobutyl Dithiophosphoric acid
Na DEDTC: Sodium salt of Diethyl Dithiocarbamic acid
TPA DIBDTP: Tripropylammonium salt of Diisobutyl Dithiophosphoric acid
TPA DEDTC: Tripropylammonium salt of Diethyl Dithiocarbamic acid

Examples 30-32

Recovery of Mineral Values from a Base Metal (Copper) Containing Ore Body

An ore sample containing Cu (0.56%) is beneficiated by froth flotation. In each test, 1000 g of ore sample is ground for 6.30 min. in a mild steel rod mill containing a 10 kg rod charge and approximately 667 ml of water resulting in ground ore slurry with a particle size distribution of approximately 80% passing 106 microns. Lime is added to the mill to achieve a target pH of approximately 10 in the flotation stage. The slurry after grinding is then transferred to a 2.5 L Denver flotation cell and water is added to adjust the solids density to 33%. The slurry is agitated at 1200 rpm in the cell. The collector is added in one addition at 5 g of active collector per ton of ore in the conditioning stage. In all tests, the frother used is PBM 604 frother, available from the Cytec Industries Inc., USA, which is added at a dose of 30 g/t. Flotation is conducted for 9 min. The results are presented in Table 6.

TABLE 6

Ni ore

| Example No* | Coll1 | Coll2 | Total CollDosage, g/t | Ni Rec., % |
|---|---|---|---|---|
| 30C | TMA DIBDTP | | 5 | 82.6 |
| 31C | TEA DIBDTP | | 5 | 84.0 |
| 32 | TMA DIBDTP | TEA DIBDTP | 5 | 87.0 |

TMA DIBDTP: Trimethylammonium salt of Diisobutyl Dithiophosphoric acid
TEA DIBDTP: Triethylammonium salt of Diisobutyl Dithiophosphoric acid As employed above and throughout the disclosure, various terms are provided to assist the reader. Unless otherwise defined, all terms of art, notations and other scientific terminology used herein are intended to have the meanings commonly understood by those of skill in the mineral and/or mining chemical arts. As used herein and in the appended claims, the singular forms include plural referents unless the context clearly dictates otherwise. All numbers expressing quantities of ingredients, reaction conditions, and so forth used in the specification and claims are to be understood as being modified in all instances by the term "about." Similarly, all numbers expressed in a range as indicated by the word "between" include the upper and lower limits in the range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Various patent and/or scientific literature references have been referred to throughout this application. The disclosures of these publications in their entireties are hereby incorporated by reference as if written herein. In the case of conflicting terms, the terms of this document will prevail. In view of the above description and the examples, one of ordinary skill in the art will be able to practice the invention as claimed without undue experimentation.

Although the foregoing description has shown, described, and pointed out the fundamental novel features of the present teachings, it will be understood that various omissions, substitutions, and changes in the form of compositions, as well as the uses thereof, may be made by those skilled in the art, without departing from the scope of the present teachings. Consequently, the scope of the present invention should not be limited to the foregoing discussion, but should be defined by the appended claims.

What is claimed is:

1. A collector composition comprising:
   a) one or more of a first collector comprising an organic primary, secondary, tertiary, or quaternary ammonium salt of an organic sulfur-containing acid, wherein said organic sulfur-containing acid is selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids, hydrocarbyl trithiocarbonic acids, hydrocarbyl dithiophosphinic acids and hydrocarbyl monothiophosphinic acids; and
   b) at least one second collector selected from the group consisting of neutral collectors and organic ammonium salts of organic sulfur-containing acids, wherein the organic ammonium salts of sulfur-containing acids of the second collector are different from said organic ammonium salts of sulfur-containing acids of the first collector,
   with the proviso that when the first collector comprises a primary or secondary ammonium salt of an organic sulfur-containing acid and the second collector is a neutral collector, the neutral collector is selected from the group consisting of dihydrocarbyl thionocarbamates, dihydrocarbyl thioureas, dihydrocarbyl sulfides, trihydrocarbyl dithiocarbamates, N-hydrocarbyl-S-hydrocarbyl dithiocarbamates, dihydrocarbyl guanidines, S-hydrocarbyl dithiophosphinates, S-hydrocarbyl dithiophosphates, S-hydrocarbyl mercaptobenzothiazoles, O-hydrocarbyl monothiophosphates, and O-hydrocarbyl monothiophosphinates.

2. A collector composition according to claim 1, wherein the organic ammonium salt of an organic sulfur-containing acid of the first or second collector is a compound according to Formula I:

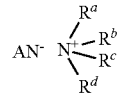

Formula I where:
AN—is an anion from an organic sulfur-containing acid selected from the group consisting of hydrocarbyl dithiophosphoric acids, hydrocarbyl monothiophosphoric acids, mercaptobenzothiazoles, hydrocarbyl xanthic acids, hydrocarbyl dithiocarbamic acids, hydrocarbyl thioglycolic acids, hydrocarbyl trithiocarbonic acids, hydrocarbyl dithiophosphinic acids and hydrocarbyl monothiophosphinic acids;
$R^a$ is a hydrocarbyl group comprising from 1 to 16 carbon atoms, optionally substituted with a —OH group and/or with one or more —$(YR')_n$—YR"groups, wherein n =0 to 3, Y is O, NR'" or S, R' is an alkylene or arylene group containing from 1 to 12 carbon atoms, R" and R'" are, each independently, H or a hydrocarbyl group containing from 1 to 12 carbon atoms; and
each of $R^b$, $R^c$ and $R^d$ are independently H or a hydrocarbyl group comprising from 1 to 16 carbon atoms, optionally substituted with a —OH group and/or with one or more —(YR')n—YR"groups, wherein n =0 to 3, Y is O, NR'" or S, R' is an alkylene or arylene group containing from 1 to 12 carbon atoms, R" and R'" are, each independently, H or a hydrocarbyl group containing from 1 to 12 carbon atoms; and wherein two or more of $R^a$, $R^b$, $R^c$ and $R^d$ may be linked to form a cyclic compound.

3. A collector composition according to claim 2, wherein $R^a$ is an alkyl group containing 1 to 10 carbon atoms, optionally substituted with a —OH group.

4. A collector composition according to claim 2, wherein each of $R^b$, $R^c$ and $R^d$ are independently H or a hydrocarbyl group containing 1 to 10 carbon atoms.

5. A collector composition according to claim 2, wherein the second collector is an organic ammonium salt of an organic sulfur-containing acid according to Formula I.

6. A collector composition according to claim 1, wherein the organic ammonium salt of the first or second collector is selected from the group consisting of methylammonium, ethylammonium, propylammonium, butylammonium, ethanolammonium, dimethylammonium, diethylammonium, dipropylammonium, dibutylammonium, trimethylammonium, (N,N-dimethyl, N-propylammonium), triethylammonium, tripropylammonium, tributylammonium, tetramethylammonium, tetraethylammonium, tetrabutylammonium, triethanolammonium, choline, triphenylammonium, ethylenediammonium, 1,3-diammonium propane, hexamethylene diammonium, diethylenetriammonium, triethylene triammonium, hexamethylene tetraammonium and diphenylethyl ammonium salts, and mixtures thereof.

7. A collector composition according to claim 6, wherein the organic ammonium salt is trimethylammonium.

8. A collector composition according to claim 1, wherein the first or second collector is selected from the group consisting of choline salt of diisobutyl dithiophosphoric acid, dimethylammonium salt of diisobutyl dithiophosphoric acid, trimethylammonium salt of mercaptobenzothiazole, choline salt of mercaptobenzothiazole, trimethylammonium salt of diisobutyl monothiophosphoric acid, choline salt of diisobutyl monothiophosphoric acid, triethylammonium salt of mercaptobenzothiazole, tripropylammonium salt of diisobutyl dithiophosphoric acid, triethylammonium salt of diethyl dithiocarbamic acid, tripropylammonium salt of dibutyl dithiocarbamic acid, trimethylammonium salt of diisobutyl dithiophosphoric acid, hexamethylene tetraammonium salt of diisobutyl dithiophosphoric acid, ethylammonium salt of diisobutyl dithiophosphoric acid, tetramethylammonium salt of diisobutyl dithiophosphoric acid, diethanolammonium salt of diisobutyl dithiophosphoric acid, triethanolammonium salt of butylthioglycolic acid, trimethylammonium salt of butyltrithiocarbonic acid, trimethylammonium salt of isobutyl xanthic acid, trimethylammonium salt of amyl xanthic acid, trimethylammonium salt of diisobutyl dithiophosphinic acid, trimethylammonium salt of monobutyl dithiocarbamic acid, tripropylammonium salt of monoethyl dithiocarbamic acid, hexamethylene tetraammonium salt of dibutyl dithiocarbamic acid, hexamethylene tetraammonium salt of dicresyl dithiophosphoric acid, hexamethylene tetraammonium salt of diethyl dithiocarbamic acid, hexamethylene tetraammonium salt of diisobutyl dithiophosphinic acid, hexamethylene tetraammonium salt of diisobutyl monothiophosphoric acid, hexamethylene tetraammonium salt of ethyl xanthic acid hexamethylene tetraammonium salt of isobutyl xanthic acid, hexamethylene tetraammonium salt of mercaptobenzothiazoles, triethylammonium salt of dicresyl dithiophosphoric acid, triethylammonium salt of diisobutyl dithiophosphinic acid, triethylammonium salt of diisobutyl dithiophosphoric acid, trimethylammonium salt of dibutyl dithiocarbamic acid, trimethylammonium salt of dicresyl dithiophosphoric acid, trimethylammonium salt of dicresyl monothiophosphoric acid, trimethylammonium salt of dicresyl monothiophosphinic acid, trimethylammonium salt of diethyl dithiocarbamic acid, trimethylammonium salt of diethyl dithiophosphinic acid, and trimethylammonium salt of ethyl xanthic acid.

9. A collector composition according to claim 8, wherein the first or second collector is selected from the group consisting of trimethylammonium salt of mercaptobenzothiazole, trimethylammonium salt of diisobutyl monothiophosphoric acid, trimethylammonium salt of diisobutyl dithiophosphoric acid, trimethylammonium salt of butyltrithiocarbonic acid, trimethylammonium salt of isobutyl xanthic acid, trimethylammonium salt of amyl xanthic acid, trimethylammonium salt of diisobutyl dithiophosphinic acid, trimethylammonium salt of monobutyl dithiocarbamic acid, trimethylammonium salt of dibutyl dithiocarbamic acid, trimethylammonium salt of dicresyl dithiophosphoric acid, trimethylammonium salt of dicresyl monothiophosphoric acid, trimethylammonium salt of dicresyl monothiophosphinic acid, trimethylammonium salt of diethyl dithiocarbamic acid, trimethylammonium salt of diethyl dithiophosphinic acid, and trimethylammonium salt of ethyl xanthic acid.

10. A collector composition according to claim 8, wherein the first or second collector is selected from the group consisting of hexamethylene tetraammonium salt of diisobutyl dithiophosphoric acid, hexamethylene tetraammonium salt of dibutyl dithiocarbamic acid, hexamethylene tetraammonium salt of dicresyl dithiophosphoric acid, hexamethylene tetraammonium salt of diethyl dithiocarbamic acid, hexamethylene tetraammonium salt of diisobutyl dithiophosphinic acid, hexamethylene tetraammonium salt of diisobutyl monothiophosphoric acid, hexamethylene tetraammonium salt of ethyl xanthic acid hexamethylene tetraammonium salt of isobutyl xanthic acid, and hexamethylene tetraammonium salt of mercaptobenzothiazoles.

11. A collector composition according to claim 8, wherein the first or second collector is selected from the group consisting of triethylammonium salt of mercaptobenzothiazole, triethylammonium salt of diethyl dithiocarbamic acid, triethylammonium salt of dicresyl dithiophosphoric acid, triethylammonium salt of diisobutyl dithiophosphinic acid, and triethylammonium salt of diisobutyl dithiophosphoric acid.

12. A collector composition according to claim 1, wherein the first collector and the second collector comprise different organic ammonium cations and/or the first collector and the second collector comprise different organic sulfur-containing anions.

13. A collector composition according to claim 1, wherein the first collector is an organic tertiary or quaternary ammonium salt of an organic sulfur-containing acid.

14. A collector composition according to claim 1, wherein the second collector is a neutral collector.

15. A collector composition according to claim 1, wherein the first collector is a primary or secondary organic ammonium salt of a sulfur-containing acid and the second collector is a neutral collector selected from the group consisting of hydrocarbyloxycarbonyl hydrocarbyl thionocarbamates, hydrocarbyloxycarbonyl hydrocarbyl dithiocarbamates, hydrocarbyloxycarbonyl hydrocarbyl thioureas, hydrocarbyloxycarbonyl hydrocarbyl trithiocarbonates, dihydrocarbyl sulfides, dihydrocarbyl xanthates, trihydrocarbyl dithiocarbamates, N-hydrocarbyl-S-hydrocarbyl dithiocarbamates, dihydrocarbyl thionocarbamates, dihydrocarbyl thioureas, dihydrocarbyl xanthogen formates, dihydrocarbyl thioglycolates, dihydrocarbyl trithiocarbonates, S-hydrocarbyl dithiophosphates, S-hydrocarbyl dithiophosphinates, S-hydrocarbyl mercaptobenzothiazoles, O-hydrocarbyl monothiophosphates, O-hydrocarbyl monothiophosphinates and dihydrocarbyl guanidines.

16. A collector composition according to claim 15, wherein the neutral collector is selected from the group consisting of S-hydrocarbyl O, O'-dihydrocarbyl dithiophosphates; S-hydrocarbyl, N,N-dihydrocarbyl dithiocarbamates; S-hydrocarbyl, N-hydrocarbyl dithiocarbamates; S-hydrocarbyl xanthate esters; S-hydrocarbyloxycarbonyl, O-hydrocarbyl xanthates; dihydrocarbyl xanthogen formates; N-hydrocarbyloxycarbonyl, S-hydrocarbyl dithiocarbamates; S,S'-dihydrocarbyl trithiocarbonates; N,N'-dihydrocarbyl thioureas; S-hydrocarbyl mercaptobenzothiazoles; N-allyl, O-hydrocarbyl thionocarbamates; S-hydrocarbyl P,P dihydrocarbyl dithiophosphinates; dihydrocarbyl sulfides; N-hydrocarbyloxycarbonyl, O-hydrocarbyl thionocarbamates; dihydrocarbyl thionocarbamates; and N-hydrocarbyloxycarbonyl, N'-hydrocarbyl thioureas.

17. A collector composition according to claim 15, wherein the neutral collector is selected from N-n-butoxycarbonyl, O-n-butyl thionocarbamate; O-isopropyl, N-ethyl thionocarbamate; and S-allyl, O-amyl xanthate ester.

18. A collector composition according to claim 1, wherein the first collector is the trimethylammonium salt of diisobutyl dithiophosphoric acid, and the second collector is a N-hydrocarbyloxycarbonyl, S-hydrocarbyl dithiocarbamate.

19. A collector composition according to claim 1, wherein the first collector is the tripropylammonium salt of dicresyl dithiophosphoric acid, and the second collector is a N-hydrocarbyloxycarbonyl, O-hydrocarbyl thionocarbamate.

20. A collector composition according to claim 1, wherein the first collector is the triethylammonium salt of mercaptobenzothiazole, and the second collector is a dihydrocarbyl thionocarbamate.

21. A collector composition according to claim 1, wherein the first collector is the hexamethylene tetraammonium salt of isobutyl xanthic acid, and the second collector is a dihydrocarbyl sulfide.

22. A collector composition according to claim 1, wherein the first collector is the choline salt of diisobutyl monothiophosphoric acid, and the second collector is a S-hydrocarbyl xanthate ester.

23. A collector composition according to claim 1, wherein the first collector is the trimethylammonium salt of diisobutyl dithiophosphoric acid, and the second collector is a N-n-butoxycarbonyl O-n-butyl thionocarbamate.

24. A collector composition according to claim 1, wherein the first collector is the hexamethylene tetraammonium salt of dicresyl dithiophosphoric acid, and the second collector is a N-butoxycarbonyl, S-butyl dithiocarbamate.

25. A collector composition according to claim 1, wherein the first collector is the trimethylammonium salt of diethyl dithiocarbamic acid, and the second collector is a S-allyl, O-amyl xanthate ester.

26. A collector composition according to claim 1, wherein the first collector is the triethylammonium salt of mercaptobenzothiazole, and the second collector is a O-isopropyl N-ethyl thionocarbamate.

27. A collector composition according to claim 1, wherein the first collector is the trimethylammonium salt of diisobutyl dithiophosphoric acid, the second collector is a N-allyl, O-isobutyl thionocarbamate, and a third collector is a O-isopropyl N-ethyl thionocarbamate.

28. A collector composition according to claim 1, wherein the first collector is the trimethylammonium salt of diisobutyl dithiophosphoric acid, the second collector is a N-butoxycarbonyl, S-butyl dithiocarbamate, a third collector is a N-n-butoxycarbonyl O-n-butyl thionocarbamate, and a fourth collector is the triethylammonium salt of mercaptobenzothiazole.

29. A collector composition according to claim 1, wherein the first collector and the second collector are present in a weight ratio between 1:99 to 99:1.

30. A collector composition according to claim 1, wherein the collector composition is substantially free of water.

31. A collector composition according to claim 1, further comprising one or more additive selected from the group consisting of hydrocarbon oils, surfactants, aliphatic alcohols, glycols, glycol ethers, and non-aqueous solvents.

32. A method of recovering at least one value mineral from an ore containing said at least one value mineral, the process comprising the steps of:
   subjecting the ore to a froth flotation process; and
   adding a beneficiating amount of a collector composition as defined by claim 1 at one or more stages of the froth flotation process, thereby recovering the at least one value mineral from the ore.

33. A method according to claim 32, wherein the at least one value mineral is selected from the group consisting of copper, cobalt, lead, zinc, nickel, molybdenum, gold, silver, and platinum group metals.

34. A method according to claim 32, wherein the beneficiating amount of the collector composition is an amount between 0.5 and 500 grams per ton of ore.

* * * * *

UNITED STATES PATENT AND TRADEMARK OFFICE
CERTIFICATE OF CORRECTION

PATENT NO. : 9,302,274 B2
APPLICATION NO. : 13/653669
DATED : April 5, 2016
INVENTOR(S) : Nagaraj et al.

It is certified that error appears in the above-identified patent and that said Letters Patent is hereby corrected as shown below:

IN THE CLAIMS:

Claim 2:
Column 24, Line 20: "0" should be replaced with --O--.

Signed and Sealed this
Fourteenth Day of June, 2016

Michelle K. Lee
*Director of the United States Patent and Trademark Office*